(12) United States Patent
Ohler

(10) Patent No.: US 9,127,748 B1
(45) Date of Patent: Sep. 8, 2015

(54) CABLE FASTENER

(76) Inventor: Gary Ohler, Berlin, PA (US)

( * ) Notice: Subject to any disclaimer, the term of this patent is extended or adjusted under 35 U.S.C. 154(b) by 551 days.

(21) Appl. No.: 13/432,128

(22) Filed: Mar. 28, 2012

Related U.S. Application Data (60) Provisional application No. 61/470,641, filed on Apr. 1, 2011.

(51) Int. Cl.
*F16G 11/10* (2006.01)

(52) U.S. Cl.
CPC .............. *F16G 11/10* (2013.01); *F16G 11/105* (2013.01); *Y10T 24/3651* (2015.01)

(58) Field of Classification Search
CPC ....... B63B 21/08; F16G 11/00; F16G 11/146; F16G 11/04; F16G 11/044; F16G 11/048; F16G 11/10; F16G 11/101; F16G 11/105; F16G 11/106
USPC ...... 24/129 R, 136 R, 132 R, 134 R, 134 KB, 24/134 L, 134 P, 132 AA, 115 R
See application file for complete search history.

(56) References Cited

U.S. PATENT DOCUMENTS

| | | | |
|---|---|---|---|
| 1,486,507 A * | 3/1924 | Walker | 24/134 P |
| 2,226,393 A * | 12/1940 | Seeger et al. | 24/134 P |
| 3,198,290 A * | 8/1965 | Di Maio | 188/65.1 |
| 3,289,260 A * | 12/1966 | Buscall, Jr. | 24/129 R |
| 3,638,912 A | 2/1972 | Moreno | |
| 3,766,610 A | 10/1973 | Thorsbakken | |
| 3,782,059 A | 1/1974 | Reed | |
| 3,791,623 A | 2/1974 | Bozik | |
| 3,897,664 A | 8/1975 | Bogese, II | |
| 3,999,340 A | 12/1976 | Bogese et al. | |
| 4,078,277 A | 3/1978 | McCracken | |
| 4,278,042 A * | 7/1981 | Lindquist | 114/218 |
| 4,638,611 A | 1/1987 | Vaughn | |
| 4,645,867 A | 2/1987 | Annas | |
| 4,747,631 A * | 5/1988 | Loynes et al. | 292/307 R |
| 4,766,835 A * | 8/1988 | Randall et al. | 114/218 |
| 4,830,340 A * | 5/1989 | Knitig | 254/391 |
| 4,899,423 A * | 2/1990 | Randall | 24/134 R |
| 4,978,085 A | 12/1990 | Letourneau | |
| 5,092,641 A * | 3/1992 | Penick, Jr. | 292/307 R |
| 5,401,011 A * | 3/1995 | Gatenby et al. | 269/131 |
| 5,517,792 A | 5/1996 | Champa et al. | |
| 5,548,873 A * | 8/1996 | Macias | 24/134 R |
| 5,852,853 A * | 12/1998 | Pennoyer, Jr. | 24/134 P |
| 6,123,571 A * | 9/2000 | Craft, Jr. | 439/463 |
| 6,245,991 B1 | 6/2001 | Ryan | |
| 6,832,414 B2 * | 12/2004 | Urban et al. | 24/115 L |
| 7,337,504 B1 * | 3/2008 | Casey | 24/134 P |
| 8,001,660 B2 * | 8/2011 | Cai et al. | 24/136 R |
| 8,578,566 B2 * | 11/2013 | Jolly et al. | 24/136 R |
| 2003/0019999 A1 | 1/2003 | Hill, III et al. | |
| 2003/0115723 A1 * | 6/2003 | Shuey | 24/136 R |
| 2004/0194399 A1 | 10/2004 | Fantozzi | |
| 2009/0106947 A1 * | 4/2009 | Cai et al. | 24/136 R |

* cited by examiner

*Primary Examiner* — Robert J Sandy
*Assistant Examiner* — Rowland Do
(74) *Attorney, Agent, or Firm* — Gerry J. Elman; Elman Technology Law, P.C.

(57) ABSTRACT

A device having at least two channels, each channel having a corresponding locking element which restricts movement of a cable, guy wire, rope, cord, or the like to one direction. Methods for using the device to splice cables, form loops, and secure a cable to and apply tension to a fixed structure, such as a telephone pole.

15 Claims, 11 Drawing Sheets

CABLE FASTENER

CROSS-REFERENCE TO RELATED APPLICATIONS

This application claims the benefit under 35 U.S.C. §119 (e) of U.S. Provisional Application 61/470,641 filed Apr. 1, 2011, the entire contents of which are incorporated herein by reference.

TECHNICAL FIELD

The present disclosed subject matter relates to fasteners, and more specifically to fasteners for cables, guy wires, ropes, cords, and the like.

BACKGROUND

Cables, guy wires, ropes, cords, and the like (hereinafter "cables") have many uses in providing control and stability over vertically-oriented structures. One major use is to provide stabilizing tension to electrical utility poles and antennas by anchoring one end of a cable to an immobile object or the ground, and the other end to the structure to be stabilized. Another use is to provide support to sailboat masts and for controlling the end of a spar on a sailboat. Cables are also used to transport objects and are often used in conjunction with pulleys to obtain a mechanical advantage over applying direct force to the object to be moved. Given that cables have significant tensile strength and comparatively minimal compressive strength, most uses involve the application of tension in carrying out a task. In order to apply and maintain tension in a cable, a clamping, winching, or other fastening device is generally employed.

SUMMARY OF THE INVENTION

The present invention provides a device and method for fastening a cable, guy wire, rope, cord, or the like (hereinafter "cable") to maintain tension on the line.

A device according to the present invention includes a housing having multiple channels, each of which is adapted for a cable to pass through it. Within each channel is at least one pivotally-mounted cog (hereinafter "locking element") which allows a cable to move through the corresponding channel in one direction (the "allowed direction") and prevents the cable from moving in the opposite direction (the "disallowed direction"). In preferred embodiments, each locking element is cambered and arcuate in shape, spring-biased to a locked position, and has spikes, ridges, cleats, or teeth (hereinafter "teeth") to maximize the amount of friction between the locking element and a cable inside the channel. The locking element is pivotally mounted to a pivot post which is offset from the vertical center of the locking element. The result is that, as the locking element rotates, the arcuate surface of the locking element either extends into or retracts from the opposite side of the channel in which it is situated.

In certain embodiments, each locking element may be mounted within the device at a location such that, if allowed to rotate to the locked position due to the aforementioned spring-bias, the locking element is fully against the opposite side of the channel, prevented from rotating further in that direction. This ensures that any cable passing through the corresponding channel will engage with the locking element, regardless of how thin the cable is.

When a cable is in the channel, motion of a cable in the disallowed direction causes the locking element, which is frictionally engaged with the cable, to rotate such that the arcuate surface extends towards the opposite side of the channel, thereby squeezing the cable between the side of the channel and the arcuate surface of the locking element and thereby preventing further movement in the disallowed direction. In preferred embodiments, the aforementioned opposite side of the channel has teeth to frictionally engage with the cable.

Also in preferred embodiments, on each locking element is a release post which extends perpendicularly from the locking element and through a corresponding guide slot in the front face of the device. The release post allows a person to manually rotate the locking element so as to disengage it from a cable, thereby unlocking the device. In the unlocked state of such a cable fastener, a cable can freely pass through the corresponding channel in the allowed or disallowed direction.

In general, the location of a pivot post with respect to its corresponding locking element determines what the allowed and disallowed directions are in the corresponding channel.

Various embodiments of the present invention can be manufactured such that the allowed and disallowed directions of the locking elements differ from one embodiment to another. For example, one embodiment of the invention may be manufactured having two channels, each channel having a single locking element. The allowed and disallowed directions of the locking elements in the two channels are opposite.

A useful application of such an embodiment of the invention is that one person can operate the device to install a telephone pole guy wire without requiring the aid of a second person. With such a cable fastener, the person feeds the guy wire through one channel of the device and loops the guy wire back on itself by feeding the guy wire through another channel of the device. The person can then adjust the size of the resulting loop to provide the desired tension on the guy wire.

In another application of such a cable fastener, the device can be used for splicing cables together. For example, a first cable is fed into a first channel of the device in one direction and a second cable is fed into a second channel of the device in the opposite direction. Given that the locking elements of the two respective channels have opposite allowed and disallowed directions, the device allows the cables to act as a single cable, preventing them from separating when tension is exerted on opposite ends of the combined cable.

Another embodiment of the present invention includes two channels, each having a corresponding locking element, wherein the allowed and disallowed directions of the first channel are respectively the same as the allowed and disallowed directions of the second channel. In this configuration, two ends of a cable can be fed into each of the two channels in the same direction. Given that pulling on the loop results in tension on both ends of the cable in the disallowed direction, the loop is prevented from expanding or being pulled out of the device.

Other embodiments of the present invention are contemplated which include two or more locking elements per channel.

The material for the components and housing of the device is selected based on the intended application. Devices intended for heavy-duty applications would typically be of metal. For outdoor uses, metal which is resistant to rust and corrosion is preferred. For light-duty applications, plastics are preferred in order to reduce weight and manufacturing cost. Other materials such as carbon fiber, various polymer blends, wood, and/or stone may be used.

Based on the above discussion of the device in its various possible forms and the corresponding methods of using it, the following are aspects of the invention.

An aspect of the invention is a cable fastener comprising:

a housing including a left side, a right side, a top, a bottom, a front face, and a back face;

a first channel extending through the cable fastener from the top to the bottom, adjacent to the left side;

a second channel extending through the cable fastener from the top to the bottom, adjacent to the right side;

a first arcuate locking element adapted to allow for movement of a first length of cable through the first channel in only one direction, said first arcuate locking element having a vertical center and being pivotally mounted inside the first channel on a first pivot post, said first pivot post being inside the first channel, opposite the left side of the cable fastener, and vertically offset from the vertical center of the first arcuate locking element;

a second arcuate locking element adapted to allow for movement of a second length of cable through the second channel in only one direction, said second arcuate locking element having a vertical center and being pivotally mounted inside the second channel on a second pivot post, said second pivot post being inside the second channel, opposite the right side of the cable fastener, and vertically offset from the vertical center of the second arcuate locking element.

Another aspect of the invention is the cable fastener as described above, wherein each arcuate locking element is a cambered cog.

Another aspect of the invention is the cable fastener as described above, wherein each arcuate locking element includes teeth adapted to frictionally engaging with a length of cable.

Another aspect of the invention is the cable fastener as described above, wherein each channel includes teeth opposite the corresponding arcuate locking element.

Another aspect of the invention is the cable fastener as described above, wherein each arcuate locking element is spring-biased to a locked position.

Another aspect of the invention is the cable fastener as described above, wherein each arcuate locking element is pivotally mounted within the corresponding channel such that, in the locked position, the arcuate locking element abuts the opposite side of the channel.

Another aspect of the invention is the cable fastener as described above, wherein each arcuate locking element further includes a release post protruding through the front face of the cable fastener, wherein the release post is adapted to allow a person to rotate the arcuate locking element to an unlocked position, no longer restricting movement of a cable in the corresponding channel.

Another aspect of the invention is the cable fastener as described above, wherein the front face includes a guide slot for each release post.

Another aspect of the invention is a cable fastener as described above, wherein the first arcuate locking element allows upward movement (i.e., towards the top of the cable fastener) and prevents downward movement (i.e., towards the bottom of the cable fastener) of the first length of cable in the first channel; and the second arcuate locking element prevents upward movement and allows downward movement of the second length of cable in the second channel.

Another aspect of the invention is a method for using a cable fastener as described above to form an adjustable-sized loop in a cable, comprising:

feeding the cable upwards, into the bottom of the cable fastener and out through the top of the cable fastener, through the first channel; and looping the cable back on itself by feeding the cable downwards, into the top of the cable fastener and past the second arcuate locking element, in the second channel.

Another aspect of the invention is a method for using a cable fastener as described above to connect a cable to a fixed member, comprising:

feeding the cable upwards, into the bottom of the cable fastener and out through the top of the cable fastener, through the first channel;

looping the cable around the fixed member; and feeding the cable downwards, into the top of the cable fastener and past the second arcuate locking element, in the second channel.

Another aspect of the invention is the method for using a cable fastener to connect a cable to a fixed member, as described above, further comprising:

tightening the cable by feeding the cable out of the bottom of the cable fastener, through the second channel.

Another aspect of the invention is a method for using a cable fastener as described above to splice two cables together, comprising:

feeding a first cable into the bottom of the cable fastener, in the first channel, and past the first arcuate locking device; and feeding a second cable in the top of the cable fastener, in the second channel, and past the second arcuate locking device.

Another aspect of the invention is a cable fastener as described above, wherein the first arcuate locking element prevents upward movement and allows downward movement of the first length of cable in the first channel; and the second arcuate locking element prevents upward movement and allows downward movement of the second length of cable in the second channel.

Another aspect of the invention is a method for using a cable fastener as described immediately above for forming a non-expandable loop in a cable, comprising:

feeding a first end of the cable into the top of the cable fastener, in the first channel, and downward, past the first locking element; and feeding a second of the cable into the top of the cable fastener, in the second channel, and downward, past the second locking element.

BRIEF DESCRIPTION OF THE DRAWINGS

Attention is now directed to the drawing figures, where like or corresponding numerals indicate like or corresponding components. In the drawings.

DETAILED DESCRIPTION WITH REFERENCE TO THE DRAWINGS

Figure 1:
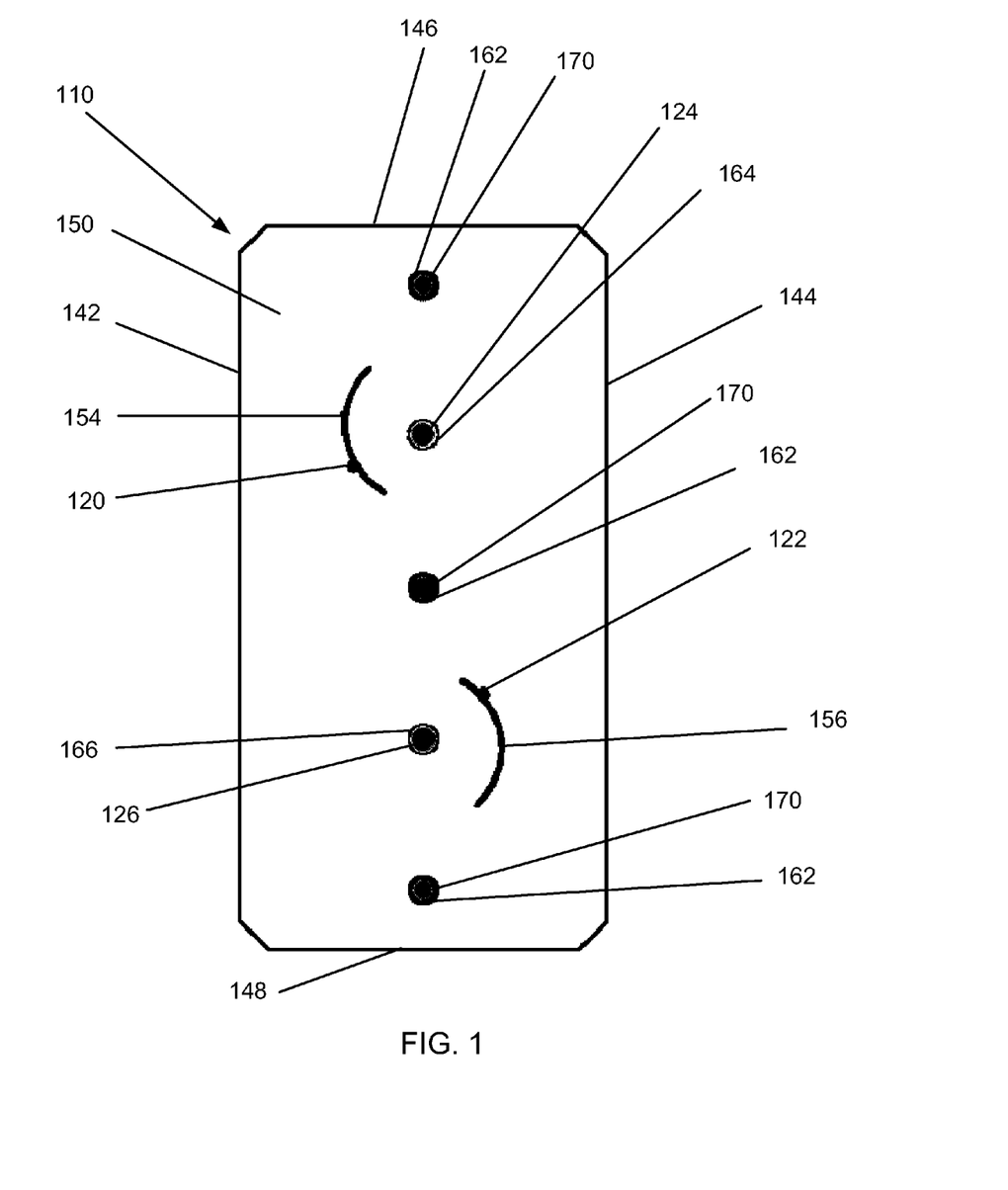
FIG. 1 is plan view of a first exemplary embodiment of a cable fastener according to the present invention.

FIG. 1 is plan view of a first exemplary embodiment of a cable fastener 110 according to the present invention. The front face 150 includes three screw holes 162 with screws 170 to hold the cable faster 110 together. In addition, pivot post hole 164 with corresponding pivot post 124 and pivot post hole 166 with corresponding pivot post 126 are shown. Locking element 116 (visible in FIG. 2) is pivotally mounted to pivot post 124 and locking element 118 (visible in FIG. 2) is pivotally mounted to pivot post 126. Locking element 116 includes a release post 120, which protrudes through front face 150, through guide slot 154. Likewise, locking element 118 also includes a release post 122 protruding through front face 150, through guide slot 156. Locking elements 116 and 118 are each spring-biased in a locked position. Release post 120 allows a person to manually rotate locking element 116 to an unlocked position. The same is true for locking element 118 and corresponding release post 122. Guide slot 154 provides a path through which release post 120 travels. Likewise, guide slot 156 provides a path through which release post 122 travels. Together, the top 146, bottom 148, left side 142, right side 144, front face 150, and back face 152 (indicated in FIG. 3) form the housing of the cable fastener 110. This embodiment of the cable fastener 110 is about six inches from top 146 to bottom 148, about three inches from the left side 142 to the right side 144, and less than an inch from the front face 150 to the back face 152. Of course, other embodiments may be of different dimensions.

Figure 2:
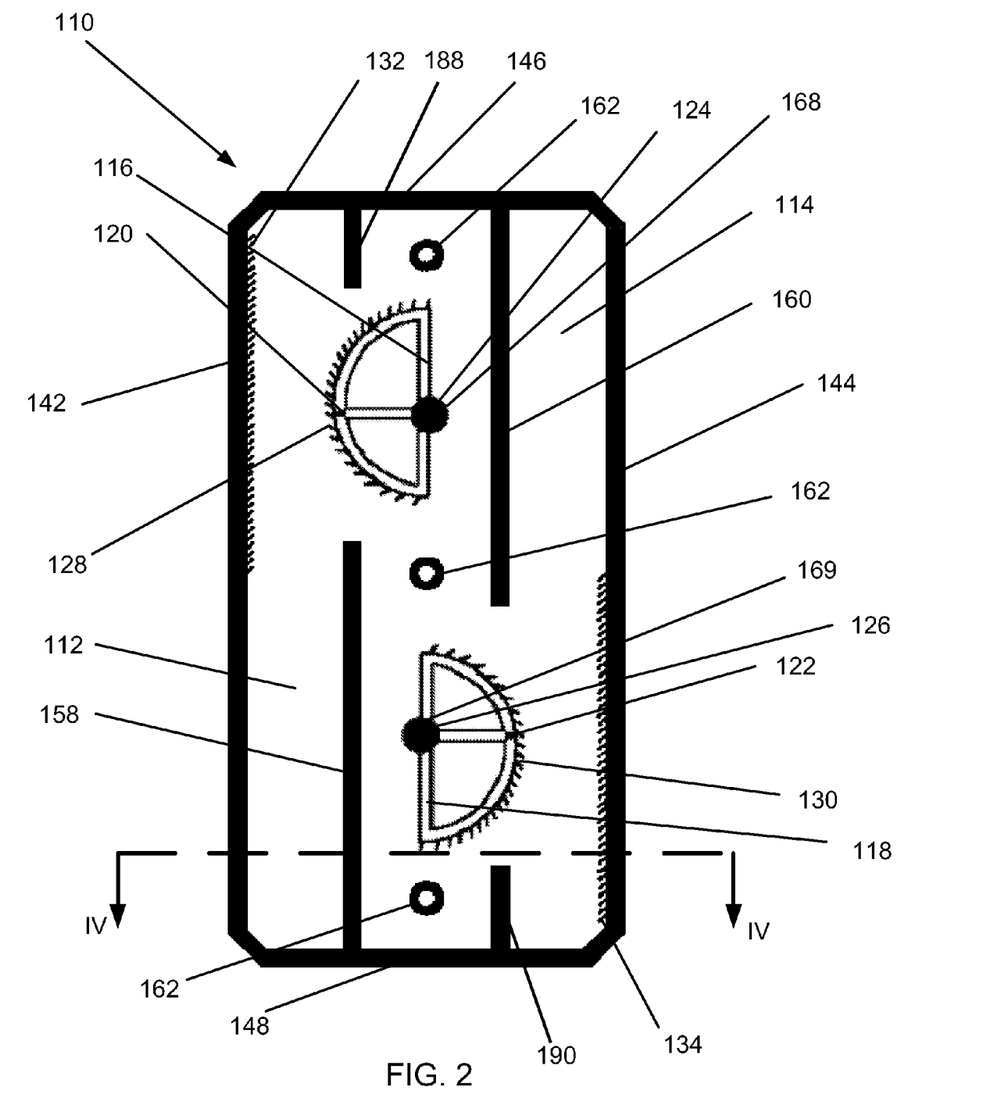
FIG. 2 is a plan view of the first exemplary embodiment of the cable fastener, with the front face removed.

FIG. 2 is a plan view of the first exemplary embodiment of the cable fastener 110, wherein the front face is removed. Visible in this view are locking elements 116 and 118, both in the unlocked position. Locking elements 116 and 118 are held in their unlocked positions by release posts 120 and 122 respectively. Locking element 116 includes teeth 128 for engaging with a cable passing through channel 112. Opposite locking element 116 are teeth 132 on the left side 142 of cable fastener 110. Teeth 132 engage with a cable passing through channel 112. When locking element 116 is in the locked position, a cable passing through channel 112 is frictionally prevented from traveling in one direction, while being free to travel in the opposite direction. As disclosed previously, these two directions are referred to herein as the disallowed direction and the allowed direction, respectively. Locking element 118 includes teeth 130 for engaging with a cable passing through channel 114, and for preventing the cable from travelling in the disallowed direction when locking element 118 is in the locked position. Cable guide 158 and internal wall 188 form a partial wall to keep a cable aligned while the cable is in channel 112. Similarly, cable guide 160 and internal wall 190 form a partial wall to keep a cable aligned while the cable is in channel 114.

Figure 3:
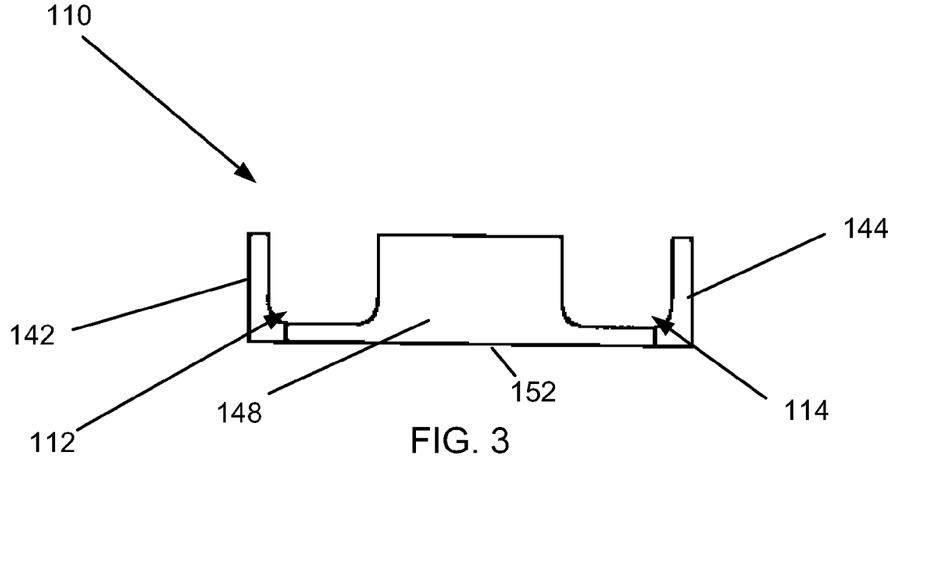
FIG. 3 is an elevation view of the bottom of the first exemplary embodiment of the cable fastener, with the front face removed.

FIG. 3 is an elevation view of the bottom 148 of the first exemplary embodiment of the cable fastener 110, wherein the front face 150 is removed. Also visible in FIG. 3 are the left side 142, the right side 144, and the back face, 152. In this view, locking elements 116 and 118, release posts 120 and 122, pivot posts 124 and 126, and teeth 128 and 130 are not shown for simplicity. Channels 112 and 114 pass through the cable fastener 110 from the bottom 148 to the top 146 (not shown).

Figure 4:
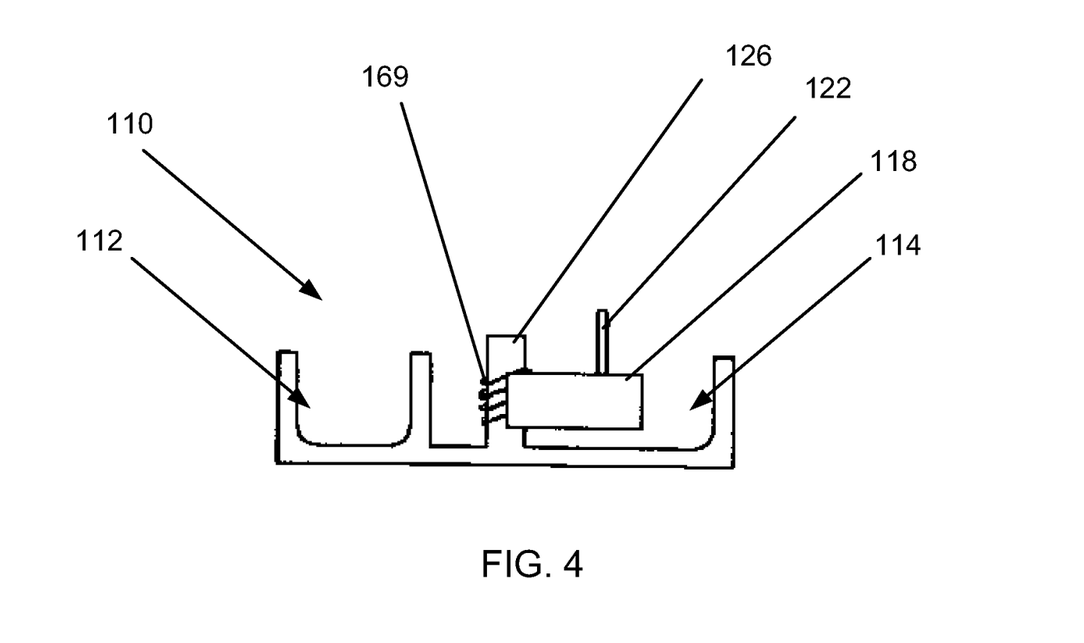
FIG. 4 is cross-sectional view of the first exemplary embodiment of the cable fastener, again with the front face removed.

FIG. 4 is cross-sectional view of the first exemplary embodiment of the cable fastener 110, again with the front face removed. The cross-sectional view is taken along line IV of FIG. 2. Locking element 116, release post 120, spring 168, pivot post 124, and teeth 128 and 130 are not shown for simplicity. Spring 169 can be seen coiled around pivot post 126. Spring 169 biases locking element 118 in a locked position. However, as seen here, a cable could pass through channel 114 because locking element 118 is in an unlocked position. Release post 122 allows a person to overcome the bias of spring 159 and manually rotate locking element 118 to an unlocked position. The ability to unlock locking element 118 with release post 122 is important because it enables a person to remove a cable from channel 114 if and when cable fastener 110 is no longer needed. It should be understood that the above discussion applies equally to locking element 116, release post 120, and channel 112.

Figure 5:
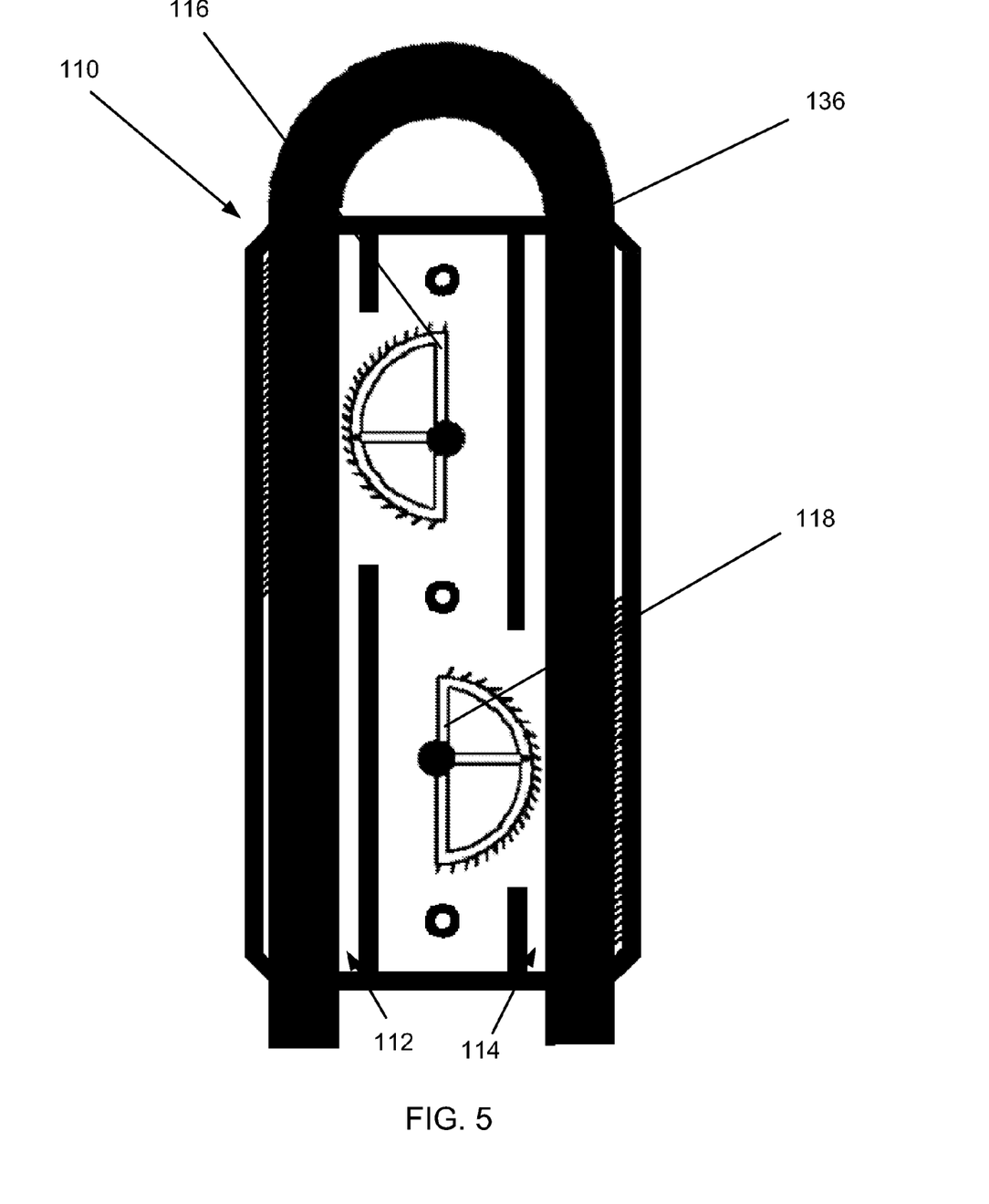
FIG. 5 is a plan view of the first exemplary embodiment of the cable fastener, with the front face removed, and a single cable looped around such that the cable is inside both channels of the cable fastener, with the locking elements in the unlocked position.

FIG. 5 is a plan view of the first exemplary embodiment of the cable fastener 110, with the front face 150 removed, and a single cable 136 looped around such that the cable is inside both channels 112 and 114 of the cable fastener 110, with the locking elements 116 and 118 in the unlocked position.

Figure 6:
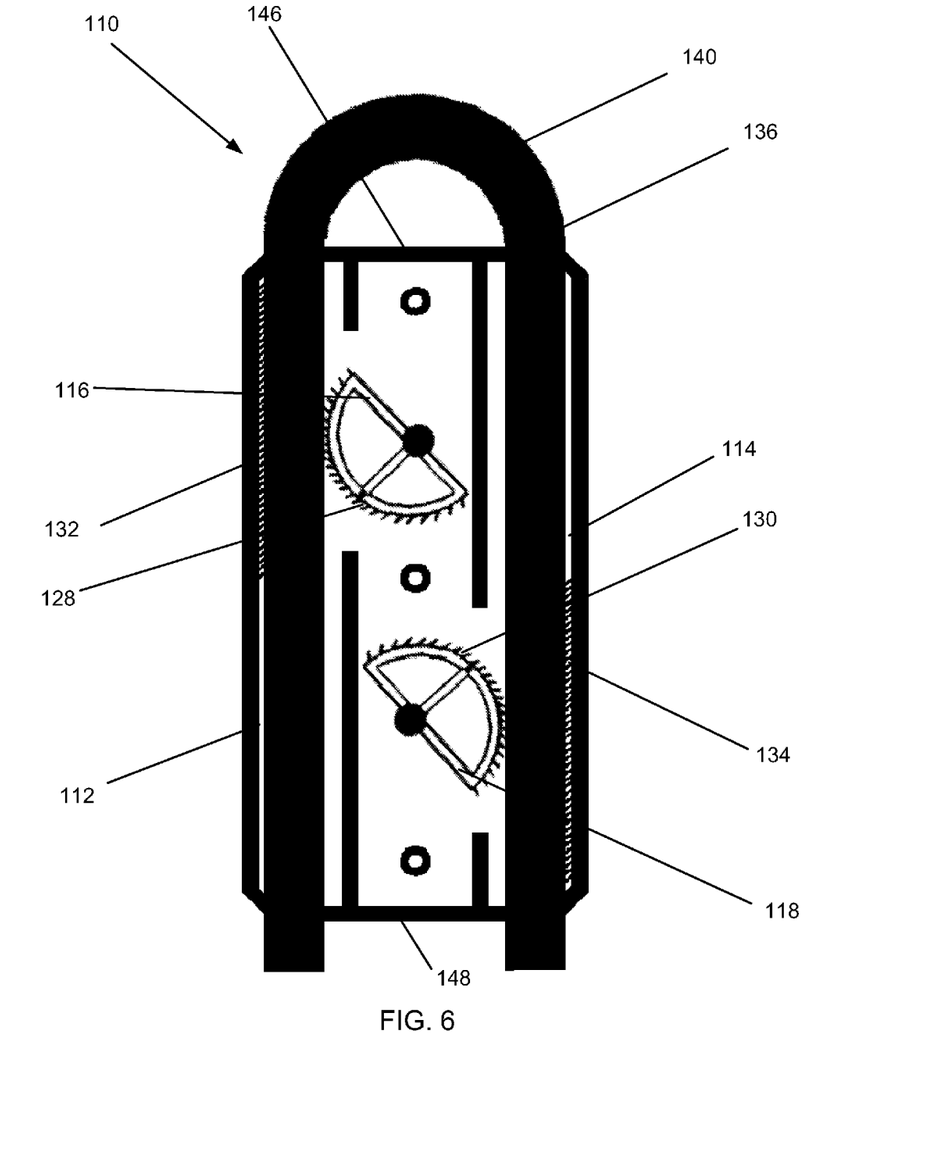
FIG. 6 is a plan view of the first exemplary embodiment of the cable fastener, with the front face removed, and a single cable looped around such that the cable is inside both channels of the cable fastener, with the locking elements in the locked position.

FIG. 6 is a plan view of the first exemplary embodiment of the cable fastener 110, with the front face 150 removed, and a single cable 136 looped around such that the cable is inside both channels 112 and 114 of the cable fastener 110, with the locking elements 116 and 118 in the locked position. As can be seen, in channel 112, the allowed direction is up, towards the top 146 and the disallowed direction is down, towards the bottom 148 of the cable fastener 110. If cable 136 were pulled down, in the disallowed direction of channel 112, locking element 116 would rotate counter-clockwise, with teeth 128 and teeth 132 frictionally engaging and squeezing cable 136 even more than shown in FIG. 6, to prevent cable 136 from traveling in the disallowed direction. Likewise, locking element 118, teeth 130, and teeth 134 cooperate to prevent movement in the disallowed direction of channel 114. In channel 114, the disallowed direction is up, towards the top 146 of cable fastener 110. The allowed direction in channel 114 is down, towards the bottom 148 of cable fastener 110. As will be understood by a person having skill in the art, this embodiment of the cable fastener 110 allows a single person to install a telephone pole guy wire (cable 136) without requiring the aid of a second person. With this embodiment, the person feeds cable 136 through channel 112, and loops the cable 136 back on itself by feeding the cable 136 through the other channel 114. The person can then adjust the size of the resulting loop 140 to provide the desired tension on the cable.

Figure 7:
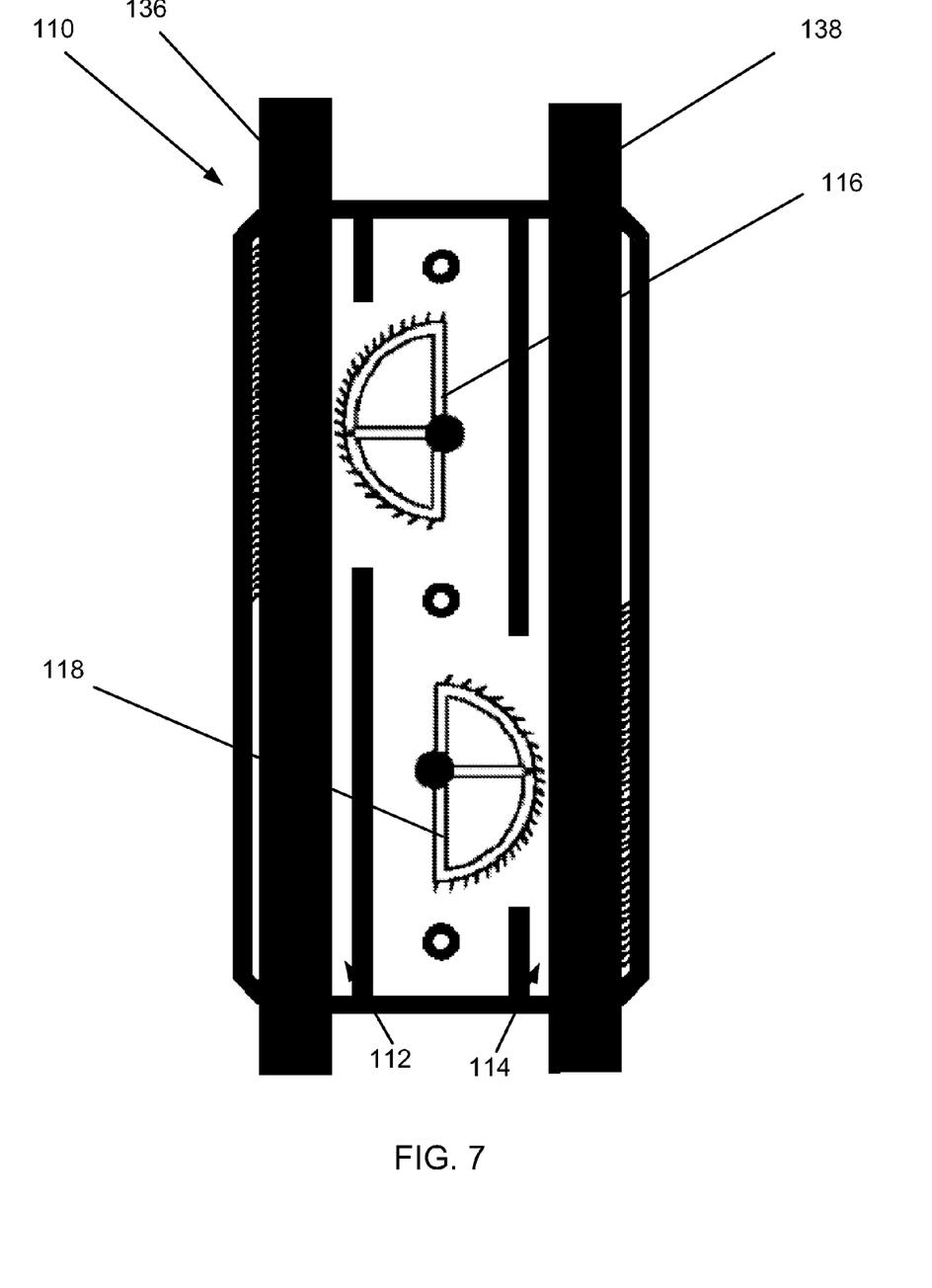
FIG. 7 is a plan view of the first exemplary embodiment of the cable fastener, with a cable in each channel of the cable fastener, with the locking elements in the unlocked position.

FIG. 7 is a plan view of the first exemplary embodiment of the cable fastener 110, with a cable 136 in channel 112 and another cable 138 in channel 114 of the cable fastener 110, with the locking elements 116 and 118 in the unlocked position. The allowed and disallowed directions in channels 112 and 114 are as described with reference to FIG. 6. As can be seen, this allows for the cable fastener 110 to be used for splicing cables 136 and 138 together. As FIG. 7 indicates, a first cable 136 is fed into a first channel 112 of the cable fastener 110 in the allowed direction of channel 112, and a second cable 138 is fed into a second channel 114 of the cable fastener 110 in the allowed direction of channel 114, which is opposite to the allowed direction of channel 112. Given that the two respective channels 112 and 114 have opposite allowed and disallowed directions, the cable fastener 100 allows the cables 136 and 38 to act as a single cable, preventing them from separating when tension is exerted on opposite ends of the combined cable.

Figure 8:
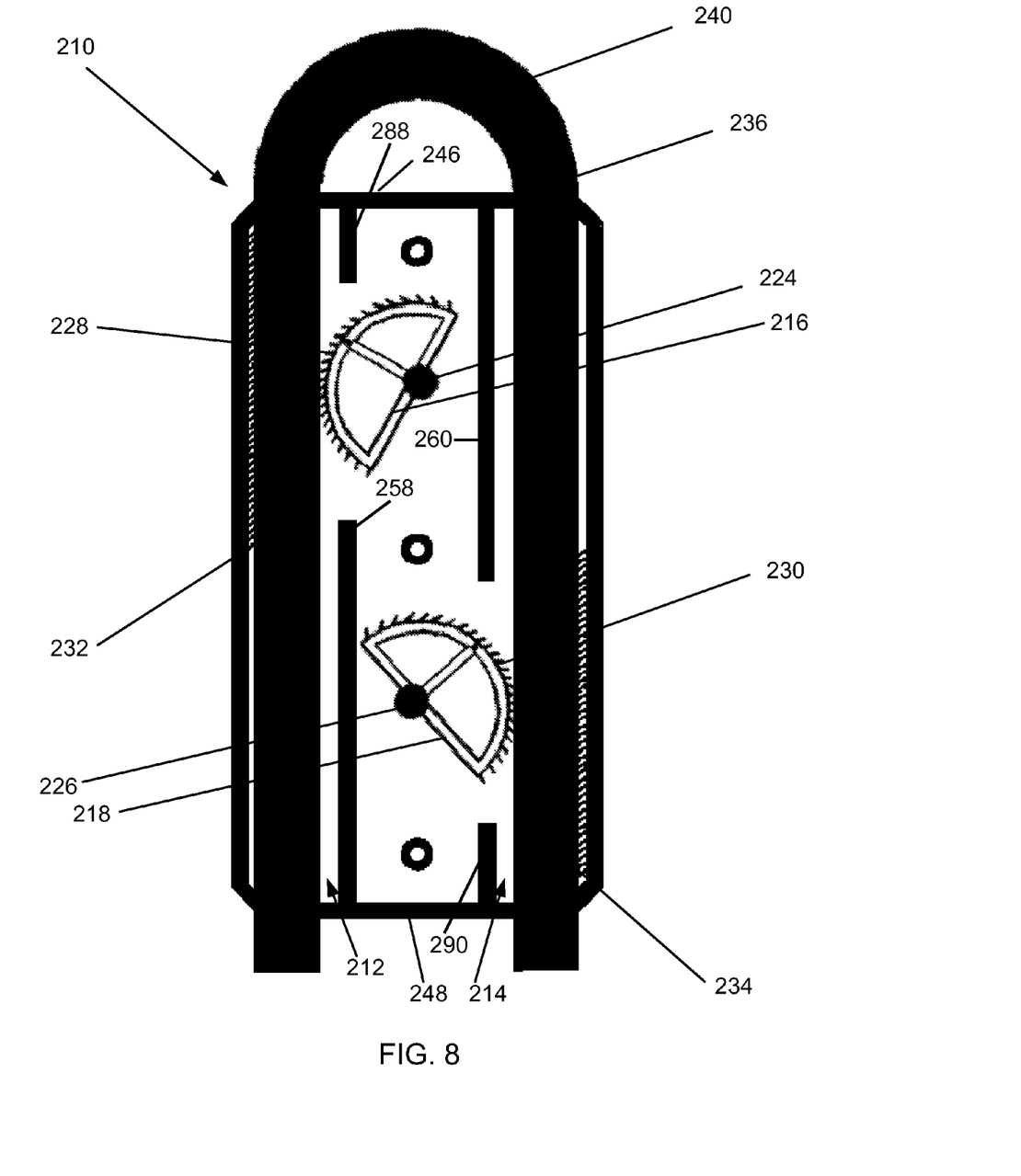
FIG. 8 is a plan view of a second exemplary embodiment of cable fastener in accordance with this invention, with the front face removed, and a single cable looped around such that the cable is inside both channels of the cable fastener, with the locking elements in the locked position.

FIG. 8 is a plan view of a second exemplary embodiment of the cable fastener 210, with the front face removed, and a single cable 236 looped around such that the cable 236 is inside both channels 212 and 214 of the cable fastener 210, with the locking elements 216 and 218 in the locked position. In this embodiment, the disallowed direction of channel 212 is up, towards the top 246. That is, when cable 236 is pulled upwards, locking element 218 rotates clockwise on pivot post 224. Teeth 228 and teeth 232 frictionally engage with cable 236 squeezing it tighter and preventing it from traveling upwards, in the disallowed direction. Additionally, the disallowed direction of channel 214 is up, towards the top 246 of cable fastener 210. Upwards force on the cable 236 causes locking element 218 to rotate counter-clockwise on pivot post 226, with teeth 230 and teeth 234 engaging with the cable 236, squeezing it and preventing it from moving upwards, in the disallowed direction. As will be understood by a person skilled in the art, since pulling on the loop 240 in cable 236 results in tension on both ends of the cable 236 in the disallowed direction, the loop 240 is prevented from expanding or being pulled out of the cable fastener 210. Cable guide 258 and internal wall 288 form a partial wall to keep a cable aligned while the cable is in channel 212. Similarly, cable guide 260 and internal wall 290 form a partial wall to keep a cable aligned while the cable is in channel 214.

Figure 9:
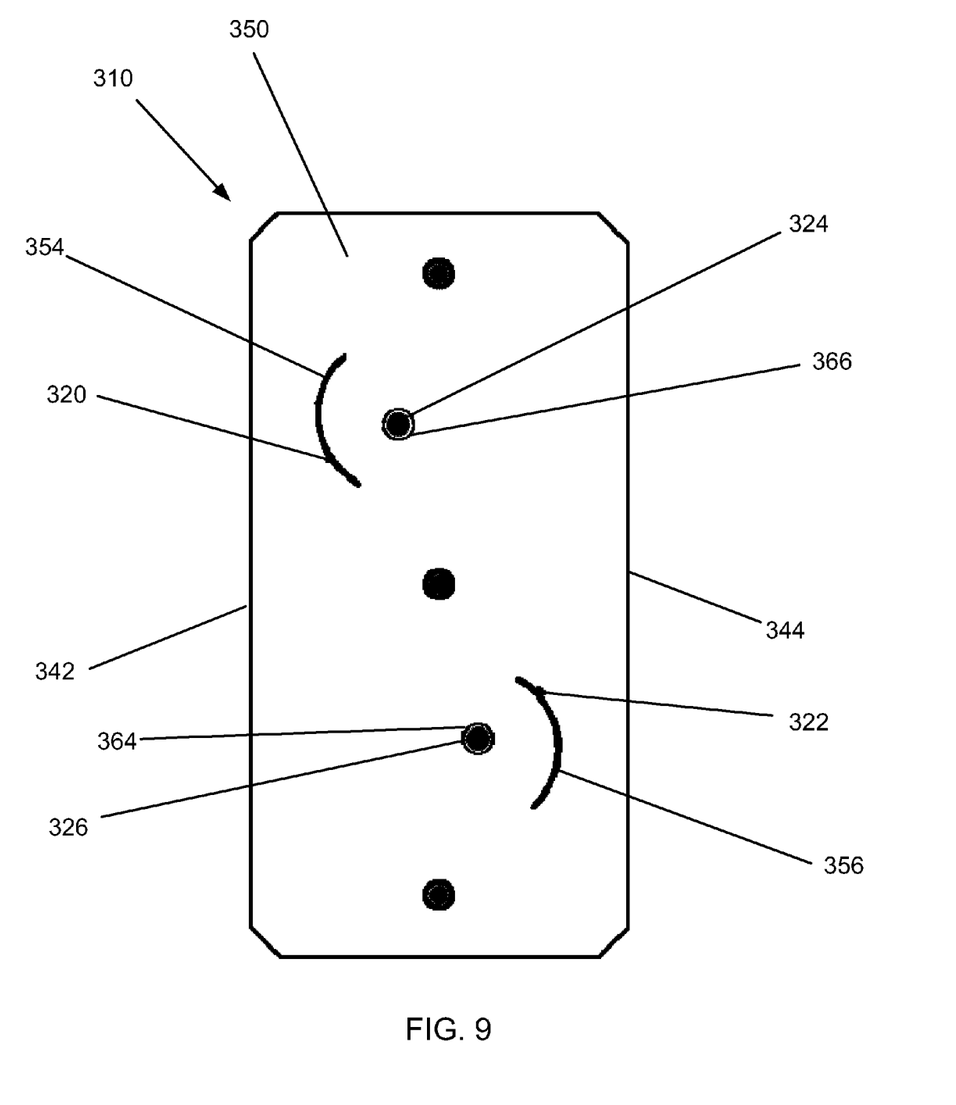
FIG. 9 is a plan view of a third exemplary embodiment of cable fastener in accordance with this invention, wherein the locking elements are mounted closer to the left and right sides of the cable fastener, respectively.

FIG. 9 is a plan view of a third exemplary embodiment of the cable fastener 310, wherein guide slot 354, release post 320, pivot post 324, and pivot post hole 366 are positioned closer to the left side 345. Similarly, guide slot 356, release post 322, pivot post 326, and pivot post hole 364 are positioned closer to the right side 344. This positioning of these elements ensures that the locking elements 316 and 318 (shown in FIG. 10) will engage any cable inserted into the cable fastener regardless of how thin the cable is.

Figure 10:
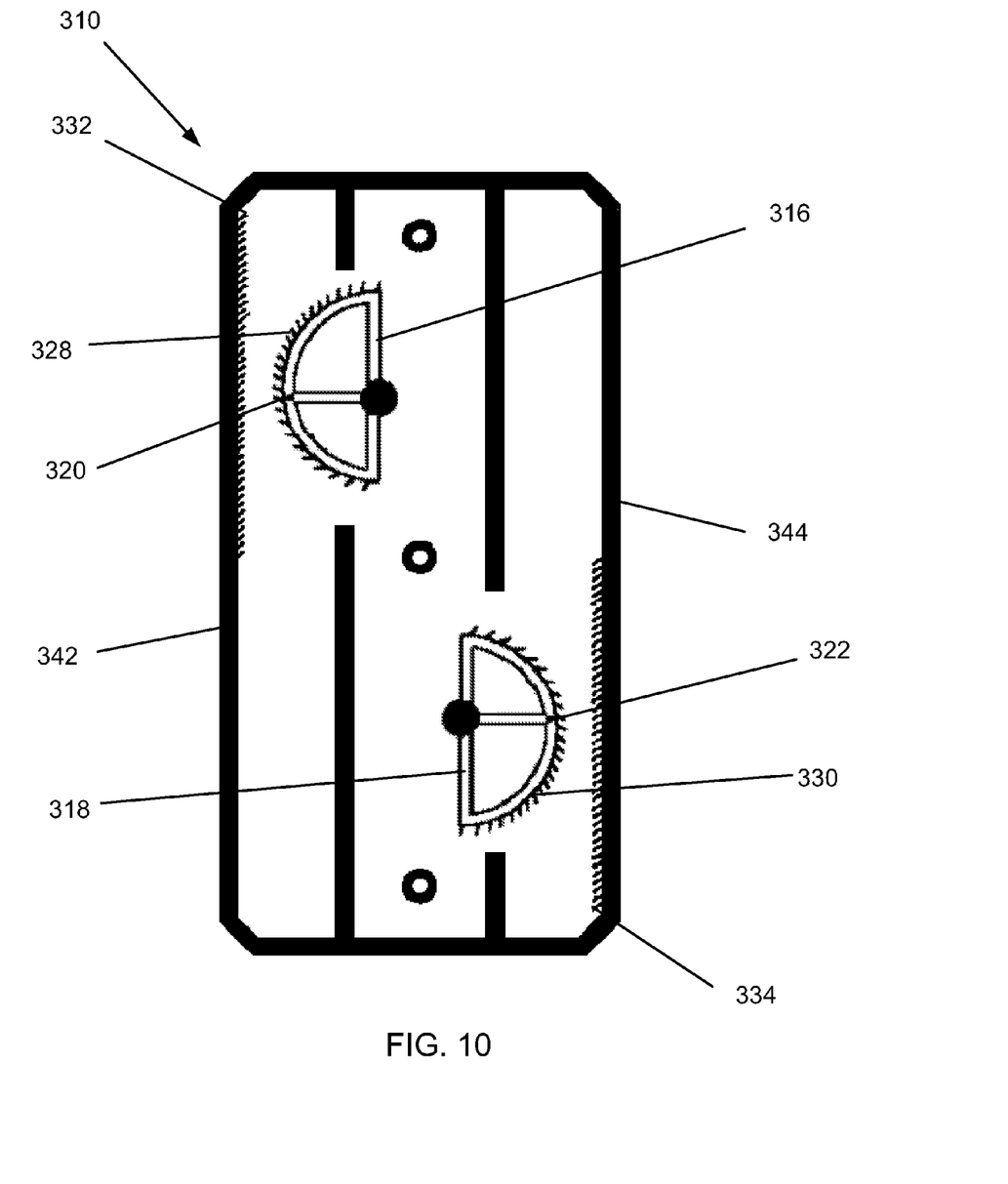
FIG. 10 is a plan view of the third exemplary embodiment of the cable fastener, with the front face removed and wherein the locking elements are mounted closer to the left and right sides of the cable fastener, respectively.

FIG. 10 is a plan view of the third exemplary embodiment of the cable fastener 310, with the front face 350 (shown in FIG. 9) removed and wherein the locking elements 316 and 318 are mounted closer to the left side 342 and right side 344 of the cable fastener 310, respectively. In this view, locking elements 316 and 318 are held in the unlocked position by release posts 320 and 322. When release posts 320 and 322 are not holding locking elements 316 and 318 in their unlocked positions, locking element 316 rotates counter-clockwise until teeth 328 touch teeth 332 and locking element 316 abuts the left side 342 of the cable fastener 310. Likewise, if allowed to rotate to its locked position, locking element 318 rotates counter-clockwise until teeth 330 touch teeth 334 and locking element 318 abuts the right side 344 of locking element 310.

Figure 11:
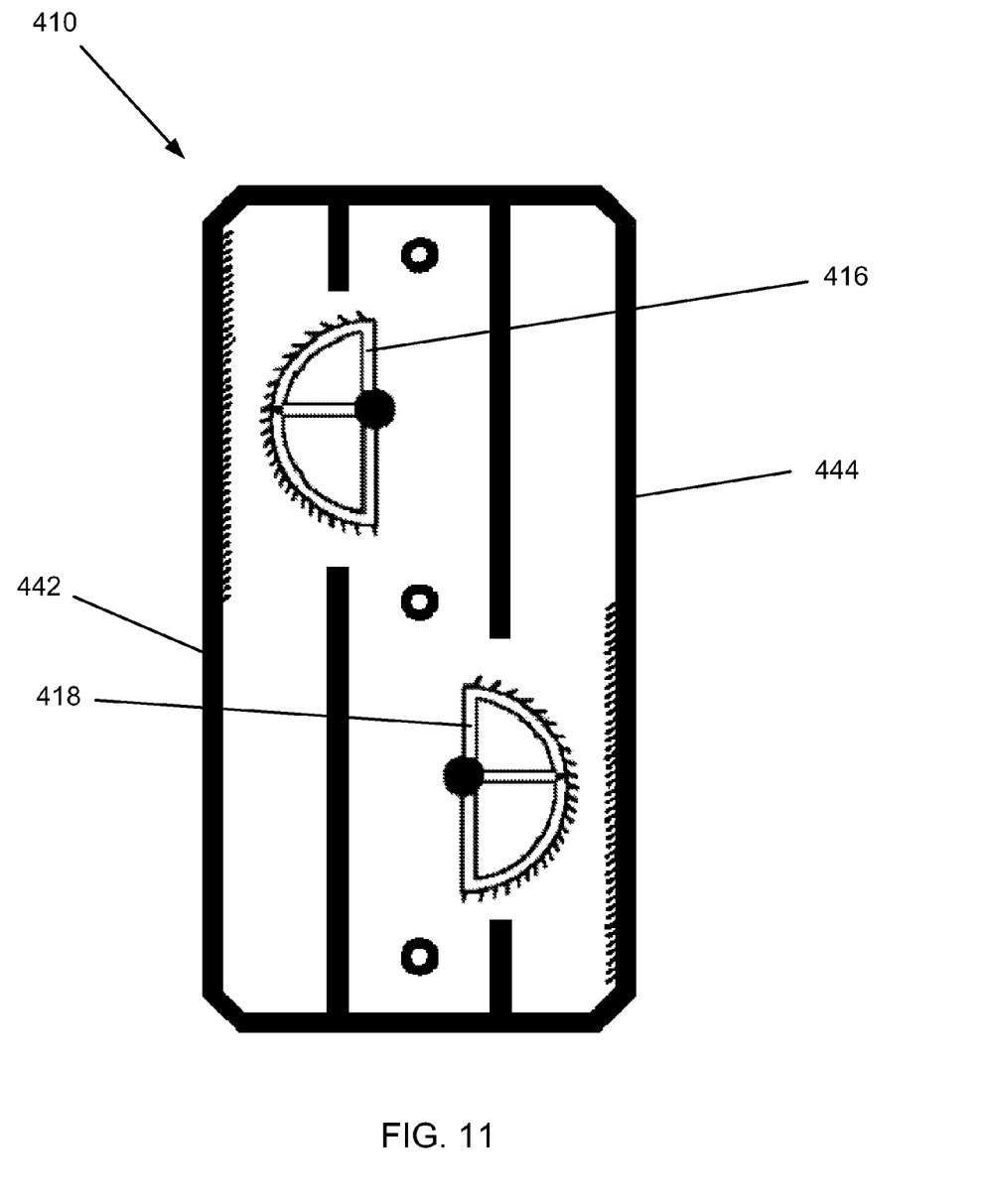
FIG. 11 is a plan view of a fourth exemplary embodiment of cable fastener in accordance with this invention, with the front face removed and wherein the locking elements are mounted closer to the left and right sides of the cable fastener, respectively.

FIG. 11 is a plan view of a fourth exemplary embodiment of the cable fastener 410, with the front face removed and wherein the locking elements 416 and 418 are mounted closer to the left side 442 and right side 444 of the cable fastener 410, than in the first two exemplary embodiments of the locking device. The above discussion of the third embodiment of the cable fastener 310 applies equally to the fourth embodiment of cable fastener 410, except that locking elements 416 and 418 are pivotally mounted and spring-biased in accordance with the second embodiment of the cable fastener 210, described with reference to FIG. 8.

While preferred embodiments of the disclosed subject matter have been described, so as to enable one of skill in the art to practice the present disclosed subject matter without undue experimentation, the preceding description is intended to be exemplary only. It should not be used to limit the scope of the disclosed subject matter.

The invention claimed is:

1. A cable fastener comprising:
  a housing including a left side, a right side, a top, a bottom, a front face, a back face, a left side internal wall, a left side cable guide, a right side internal wall, and a right side cable guide;
  a first channel extending through the housing from the top to the bottom, adjacent to the left side, the first channel being defined by the left side, the front face, the back face, the left side internal wall, and the left side cable guide;
  a second channel extending through the housing from the top to the bottom, adjacent to the right side, the second channel being defined by the right side, the front face, the back face, the right side internal wall, and the right side cable guide;
  a first arcuate locking element adapted to allow for movement of a first length of cable through the first channel in only one direction, said first arcuate locking element having a vertical center and being pivotally mounted inside the first channel on a first pivot post, said first pivot post being opposite the left side of the housing, and vertically offset from the vertical center of the first arcuate locking element;
  a second arcuate locking element adapted to allow for movement of a second length of cable through the second channel in only one direction, said second arcuate locking element having a vertical center and being pivotally mounted inside the second channel on a second pivot post, said second pivot post being opposite the right side of the housing, and vertically offset from the vertical center of the second arcuate locking element.

2. The cable fastener of claim 1, wherein each arcuate locking element is a cambered cog.

3. The cable fastener of claim 1, wherein each arcuate locking element includes teeth adapted to frictionally engage with a length of cable.

4. The cable fastener of claim 1, wherein each channel includes teeth opposite the corresponding arcuate locking element.

5. The cable fastener of claim 1, wherein each arcuate locking element is spring-biased to a locked position.

6. The cable fastener of claim 1, wherein each arcuate locking element is pivotally mounted within the corresponding channel such that, in the locked position, the arcuate locking element abuts the opposite side of the channel.

7. The cable fastener of claim 1, wherein each arcuate locking element further includes a release post protruding through the front face of the housing, wherein the release post is adapted to allow a person to rotate the arcuate locking element to an unlocked position, no longer restricting movement of a cable in the corresponding channel.

8. The cable fastener of claim 7, wherein the front face includes a guide slot for each release post.

9. The cable fastener of claim 1, wherein the first arcuate locking element is adapted to allow the first length of cable in the first channel to move towards the top of the housing and to prevent the first length of cable in the first channel from moving towards the bottom of the housing; and
 the second arcuate locking element is adapted to prevent the second length of cable in the second channel from moving towards the top of the housing and to allow the second length of cable in the second channel to move towards the bottom of the housing.

10. The cable fastener of claim 1, wherein the first arcuate locking element is adapted to prevent the first length of cable in the first channel from moving towards the top of the housing and to allow the first length of cable in the first channel to move towards the bottom of the housing; and
 the second arcuate locking element is adapted to prevent the second length of cable in the second channel from moving towards the top of the housing and to allow the second length of cable in the second channel to move towards the bottom of the housing.

11. A method for forming an adjustable-sized loop in a cable using a cable fastener, wherein the cable fastener comprises:
 a housing including a left side, a right side, a top, a bottom, a front face, a back face, a left side internal wall, a left side cable guide, a right side internal wall, and a right side cable guide;
 a first channel extending through the housing from the top to the bottom, adjacent to the left side, the first channel being defined by the left side, the front face, the back face, the left side internal wall, and the left side cable guide;
 a second channel extending through the housing from the top to the bottom, adjacent to the right side, the second channel being defined by the right side, the front face, the back face, the right side internal wall, and the right side cable guide;
 a first arcuate locking element adapted to allow the first length of cable in the first channel to move towards the top of the housing and prevent the first length of cable in the first channel from moving towards the bottom of the housing, said first arcuate locking element having a vertical center and being pivotally mounted inside the first channel on a first pivot post, said first pivot post being opposite the left side of the housing, and vertically offset from the vertical center of the first arcuate locking element;
 a second arcuate locking element adapted to prevent the second length of cable in the second channel from moving towards the top of the housing and allow the second length of cable in the second channel to move towards the bottom of the housing, said second arcuate locking element having a vertical center and being pivotally mounted inside the second channel on a second pivot post, said second pivot post being opposite the right side of the housing, and vertically offset from the vertical center of the second arcuate locking element;
 the method comprising the steps of:
 providing the cable fastener;
 feeding the cable upwards, into the bottom of the housing and out through the top of the housing, through the first channel; and
 looping the cable back on itself by feeding the cable downwards, into the top of the housing and past the second arcuate locking element, in the second channel.

12. A method for connecting a cable to a fixed member using a cable fastener, wherein the cable fastener comprises:
 a housing including a left side, a right side, a top, a bottom, a front face, a back face, a left side internal wall, a left side cable guide, a right side internal wall, and a right side cable guide;
 a first channel extending through the housing from the top to the bottom, adjacent to the left side, the first channel being defined by the left side, the front face, the back face, the left side internal wall, and the left side cable guide;
 a second channel extending through the housing from the top to the bottom, adjacent to the right side, the second channel being defined by the right side, the front face, the back face, the right side internal wall, and the right side cable guide;
 a first arcuate locking element adapted to allow the first length of cable in the first channel to move towards the top of the housing and prevent the first length of cable in the first channel from moving towards the bottom of the housing, said first arcuate locking element having a vertical center and being pivotally mounted inside the first channel on a first pivot post, said first pivot post being opposite the left side of the housing, and vertically offset from the vertical center of the first arcuate locking element;
 a second arcuate locking element adapted to prevent the second length of cable in the second channel from moving towards the top of the housing and allow the second length of cable in the second channel to move towards the bottom of the housing, said second arcuate locking element having a vertical center and being pivotally mounted inside the second channel on a second pivot post, said second pivot post opposite the right side of the housing, and vertically offset from the vertical center of the second arcuate locking element;
 the method comprising the steps of:
 providing the cable fastener;
 feeding the cable upwards, into the bottom of the housing and out through the top of the housing, through the first channel;
 looping the cable around the fixed member; and
 feeding the cable downwards, into the top of the housing and past the second arcuate locking element, in the second channel.

13. The method of claim 12 for using a cable fastener to connect a cable to a fixed member, further comprising the step of:
 tightening the cable by feeding the cable out of the bottom of the housing, through the second channel.

14. A method for splicing two cables together using a cable fastener, wherein the cable fastener comprises:
 a housing including a left side, a right side, a top, a bottom, a front face, a back face, a left side internal wall, a left side cable guide, a right side internal wall, and a right side cable guide;
 a first channel extending through the housing from the top to the bottom, adjacent to the left side, the first channel being defined by the left side, the front face, the back face, the left side internal wall, and the left side cable guide;
 a second channel extending through the housing from the top to the bottom, adjacent to the right side, the second channel being defined by the right side, the front face, the back face, the right side internal wall, and the right side cable guide;

a first arcuate locking element adapted to allow the first length of cable in the first channel to move towards the top of the housing and prevent the first length of cable in the first channel from moving towards the bottom of the housing, said first arcuate locking element having a vertical center and being pivotally mounted inside the first channel on a first pivot post, said first pivot post being opposite the left side of the housing, and vertically offset from the vertical center of the first arcuate locking element;

a second arcuate locking element adapted to prevent the second length of cable in the second channel from moving towards the top of the housing and allow the second length of cable in the second channel to move towards the bottom of the housing, said second arcuate locking element having a vertical center and being pivotally mounted inside the second channel on a second pivot post, said second pivot post being opposite the right side of the housing, and vertically offset from the vertical center of the second arcuate locking element;

the method comprising the steps of:

providing the cable fastener;

feeding a first cable into the bottom of the housing, in the first channel, and past the first arcuate locking device; and feeding a second cable in the top of the housing, in the second channel, and past the second arcuate locking device.

15. A method for forming a non-expandable loop in a cable using a cable fastener, wherein the cable fastener comprises:

a housing including a left side, a right side, a top, a bottom, a front face, a back face, a left side internal wall, a left side cable guide, a right side internal wall, and a right side cable guide;

a first channel extending through the housing from the top to the bottom, adjacent to the left side, the first channel being defined by the left side, the front face, the back face, the left side internal wall, and the left side cable guide;

a second channel extending through the housing from the top to the bottom, adjacent to the right side, the second channel being defined by the right side, the front face, the back face, the right side internal wall, and the right side cable guide;

a first arcuate locking element adapted to prevent the first length of cable in the first channel to move towards the top of the housing and allow the first length of cable in the first channel from moving towards the bottom of the housing, said first arcuate locking element having a vertical center and being pivotally mounted inside the first channel on a first pivot post, said first pivot post being opposite the left side of the housing, and vertically offset from the vertical center of the first arcuate locking element;

a second arcuate locking element adapted to prevent the second length of cable in the second channel from moving towards the top of the housing and allow the second length of cable in the second channel to move towards the bottom of the housing, said second arcuate locking element having a vertical center and being pivotally mounted inside the second channel on a second pivot post, said second pivot post being opposite the right side of the housing, and vertically offset from the vertical center of the second arcuate locking element;

the method comprising the steps of:

providing the cable fastener;

feeding a first end of the cable into the top of the housing, in the first channel, and downward, past the first locking element; and feeding a second end of the cable into the top of the housing, in the second channel, and downward, past the second locking element.

* * * * *